(12) United States Patent
Samaniego

(10) Patent No.: US 11,062,512 B2
(45) Date of Patent: Jul. 13, 2021

(54) SYSTEM AND METHOD FOR GENERATING 3D COLOR REPRESENTATION OF 2D GRAYSCALE IMAGES

(71) Applicant: RAYTHEON COMPANY, Waltham, MA (US)

(72) Inventor: Raymond Samaniego, Prosper, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/537,384

(22) Filed: Aug. 9, 2019

(65) Prior Publication Data
US 2021/0042998 A1 Feb. 11, 2021

(51) Int. Cl.
*G06T 17/00* (2006.01)
*G06T 17/10* (2006.01)
*G06T 11/00* (2006.01)

(52) U.S. Cl.
CPC ............ *G06T 17/10* (2013.01); *G06T 11/008* (2013.01); *G06T 2200/08* (2013.01); *G06T 2200/24* (2013.01); *G06T 2207/10024* (2013.01); *G06T 2207/10072* (2013.01)

(58) Field of Classification Search
CPC .............. G06T 17/10; G06T 11/008; G06T 2207/10072; G06T 2200/08; G06T 2200/24; G06T 2207/10024
See application file for complete search history.

(56) References Cited

U.S. PATENT DOCUMENTS

| | | | |
|---|---|---|---|
| 7,992,100 B2 | 8/2011 | Lundström et al. | |
| 10,102,682 B1 | 10/2018 | Samaniego et al. | |
| 10,140,715 B2 | 11/2018 | Jerebko | |
| 2005/0190955 A1* | 9/2005 | Brown | G01R 33/56 382/128 |
| 2009/0003665 A1* | 1/2009 | Berg | G06T 19/00 382/128 |

(Continued)

OTHER PUBLICATIONS

International Search Report for corresponding International Application No. PCT/US2020/033973, filed May 21, 2020, International Search Report dated Jul. 8, 2020 and dated Sep. 8, 2020 (7 pgs.).

(Continued)

*Primary Examiner* — Terrell M Robinson
(74) *Attorney, Agent, or Firm* — Lewis Roca Rothgerber Christie LLP

(57) ABSTRACT

System and method for generating 3D color representation of 2D grayscale images include: receiving a plurality of 2D grayscale image slices generated by scanning an object; selecting a reference image slice from the plurality of 2D grayscale image slices; selecting a number of additional image slices on either or both sides of the selected reference image slice; generating a 3D representation of the selected reference image slice using the selected number of additional image slices; rendering a 3D representation of the selected reference image slice by spatially colorizing the selected reference image slice; and displaying the 3D representation of the selected reference image slice on a display device. The grayscale image slices may be generated by a scanner using a CT scan image or an MRI image.

17 Claims, 6 Drawing Sheets
(3 of 6 Drawing Sheet(s) Filed in Color)

(56) References Cited

U.S. PATENT DOCUMENTS

| | | | | |
|---|---|---|---|---|
| 2009/0096807 A1* | 4/2009 | Silverstein | ............ | G06T 11/001 |
| | | | | 345/593 |
| 2009/0244065 A1* | 10/2009 | Storti | ................... | G06K 9/342 |
| | | | | 345/420 |
| 2011/0109631 A1* | 5/2011 | Kunert | ................... | G06T 15/08 |
| | | | | 345/426 |
| 2018/0082487 A1* | 3/2018 | Kiraly | .................. | G06T 11/001 |
| 2018/0174294 A1* | 6/2018 | Palma | .................. | G06T 11/001 |
| 2019/0114815 A1* | 4/2019 | Erhard | ................. | G06T 11/008 |

OTHER PUBLICATIONS

Written Opinion of the International Searching Authority for corresponding International Application No. PCT/US2020/033973, filed May 21, 2020, Written Opinion of the International Searching Authority dated Sep. 8, 2020 (14 pgs.).

Mindek, "Maximum Intensity Projection Weighted by Statistical Cues", Jan. 1, 2011, retrieved from the Internet: URL:http://old.cescg.org/CESCG-2011/papers/TUBratislava-Mindek-Peter.pdf [retrieved Apr. 17, 2018] (7 pgs.).

Woods, "Digital Image Processing", Chapter 4, Image Enhancement ED, Sep. 1, 1993 (pp. 161-201).

Invitation to Pay Additional Fees and, Where Applicable, Protest Fee in International Applicatin No. PCT/US2020/033973, filed May 21, 2020, Invitation to Pay Additional Fees dated Jul. 16, 2020 (16 pgs.).

\* cited by examiner

SYSTEM AND METHOD FOR GENERATING 3D COLOR REPRESENTATION OF 2D GRAYSCALE IMAGES

FIELD OF THE INVENTION

The present invention relates generally to image processing and more specifically to a system and method for generating three-dimensional (3D) color representation of two-dimensional (2D) grayscale images.

BACKGROUND

Computed tomography (CT) and magnetic resonance imaging (MRI) generate cross-sectional (tomographic) images (slices) of specific areas of a scanned object, and produce cross-sectional (tomographic) images (virtual "slices") of specific areas of a scanned object by processing a combination of many scans of the object taken from different angles. This allows a user to see the inside the object without cutting the object. CT scans produce data that can be manipulated in order to display various bodily structures based on their ability to absorb the X-ray beam. Digital post-processing may be used to generate a three-dimensional (3D) volume of the inside of the object from a large number of two-dimensional (2D) image slices taken around a single axis of rotation. For example, in medical imaging, cross-sectional images of a patient are used for diagnostic and therapeutic purposes.

CT scanning also has many industrial applications. For example, CT scanning utilizes X-ray equipment to produce 3D representations of components both externally and internally for internal inspection of components, such as failure analysis, assembly analysis, flaw detection, metrology, image-based finite element methods, reverse engineering applications, archaeological applications and imaging and conservation of museum artifacts. CT scanning has also been widely used in transport security (such as airport security) for explosives detection and automated baggage/parcel security scanning.

The result of a CT scan is a volume of voxels (3D pixels), which may be presented to a human observer by thin grayscale image slices, which are generally observed as planes representing a thickness of less than 3 mm. Typically, pixels in a CT scan image are displayed in terms of relative radiodensity, where the pixel is displayed according to the mean attenuation of the parts (e.g., tissues) that it corresponds to on a scale.

In medical applications, CT scans may be used to detect indications of cancer. However, cancer in some organs, such as the pancreas, may be difficult to detect with a CT scan because of the position of the organ within the body and the homogeneity of the surrounding tissue. These characteristics may reduce the detail perceptible in a CT scan image. Moreover, many radiologists view CT scans one slice at a time. Accordingly, when viewing organs that are irregular in shape and location such as the pancreas, it is difficult to analyze the organ with a single slice. A typical grayscale image slice of a pancreas is depicted in FIG. 1. As shown, it is difficult to analyze the organ and its surrounding tissues with this grayscale slice.

Combining multiple slices and spatial phases after contrast injection according to the disclosed invention, the CT scan display can be drastically enhanced and still have the look of slice by slice analysis.

SUMMARY

In some embodiments, the disclosed invention is a system and method to generate a pseudo 3D representation in color 2D with a user-selectable depth.

In some embodiments, the disclosed invention is a method for generating 3D color representation of 2D grayscale images. The method includes: receiving a plurality of 2D grayscale image slices generated by scanning an object; selecting a reference image slice from the plurality of 2D grayscale image slices; selecting a number of additional image slices on either or both sides of the selected reference image slice; generating a 3D representation of the selected reference image slice using the selected number of additional image slices; rendering a 3D representation of the selected reference image slice by spatially colorizing the selected reference image slice; and displaying the 3D representation of the selected reference image slice on a display device.

In some embodiments, the disclosed invention is a system for generating 3D color representation of 2D grayscale images. The system includes: a processor and a memory for: receiving a plurality of 2D grayscale image slices generated by scanning an object and storing the 2D grayscale image slices in the memory, selecting a reference image slice from the plurality of 2D grayscale image slices, selecting a number of additional image slices on either or both sides of the selected reference image slice, generating a 3D representation of the selected reference image slice using the selected number of additional image slices, and rendering a 3D representation of the selected reference image slice by spatially colorizing the selected reference image slice. The system further includes a display device for displaying the 3D representation of the selected reference image slice.

In some embodiments, the disclosed invention is a non-transitory computer storage medium for storing a plurality of computer instructions, the plurality of computer instructions, when executed by a processor, performing a method for generating 3D color representation of 2D grayscale images. The method includes: receiving a plurality of 2D grayscale image slices generated by scanning an object; selecting a reference image slice from the plurality of 2D grayscale image slices; selecting a number of additional image slices on either or both sides of the selected reference image slice; generating a 3D representation of the selected reference image slice using the selected number of additional image slices; rendering a 3D representation of the selected reference image slice by spatially colorizing the selected reference image slice; and displaying the 3D representation of the selected reference image slice on a display device.

In some embodiments, the number of additional image slices on either or both sides of the selected reference image is based on a size of the object. In some embodiments, the methods and system further form an image matrix by stacking the selected reference image slice and the additional image slices into a 3D array, and perform a projection of the 3D array with a predetermined viewing angle to display the 3D array on the display device. The projection may be performed using a maximum intensity projection process.

In some embodiments, the generation of the 3D representation of the selected current image slice may include: calculating spatial statistics for each voxel of the selected reference image slice and the additional image slices; weighting and log compressing the selected reference image slice and the additional image slices based on the calculated spatial statistics; spatially colorizing the weighted and log compressed image slices; and blending colors of the spatially colorized image slices to form a final color.

In some embodiments, the methods and system further form a 3D density array by one or more of taking the difference between two raw density arrays, rotating the density array, multiplying the density array by a front-lighting array, and projecting the processed density array onto a plane to form an image; and calculate spatial statistics for each of a set of vectors each corresponding to a pixel of a corresponding image slice, wherein the spatial statistics include a vector mean, a vector maximum, and a vector standard deviation.

BRIEF DESCRIPTION OF THE DRAWINGS

The patent or application file contains at least one drawing executed in color. Copies of this patent or patent application publication with color drawing(s) will be provided by the Office upon request and payment of necessary fee. These and other features, aspects, and advantages of the present invention will become better understood with regard to the following description, appended claims, and accompanying drawings.

DETAILED DESCRIPTION

In some embodiments, the disclosed invention takes a set of the CT scan slices that are above and below a current image slice being evaluated and uses spatially separated regions to generate multiple colors, as well as 3D imaging methods to enhance the current image slice. The resulting enhanced image slice appears as a significant enhancement to the scan by scan analysis, where irregular shaped objects, such as the pancreas benefit the most from this approach.

In some embodiments, the disclosed invention selects multiple image slices to combine and augment the display of the center (reference) image slice in a CT scan. The disclosed invention then performs CT scan image processing in a spatial dimension on the selected image slices to enhance them. The disclosed invention then combines this information into a single colored slice and displays the resulting image slice with color and some depth perception. Each color of the image slice indicates which phase of the scan responded to the contrast agent the most.

Figure 1:
FIG. 1 is a typical grayscale image slice of a pancreas.
Figure 2:
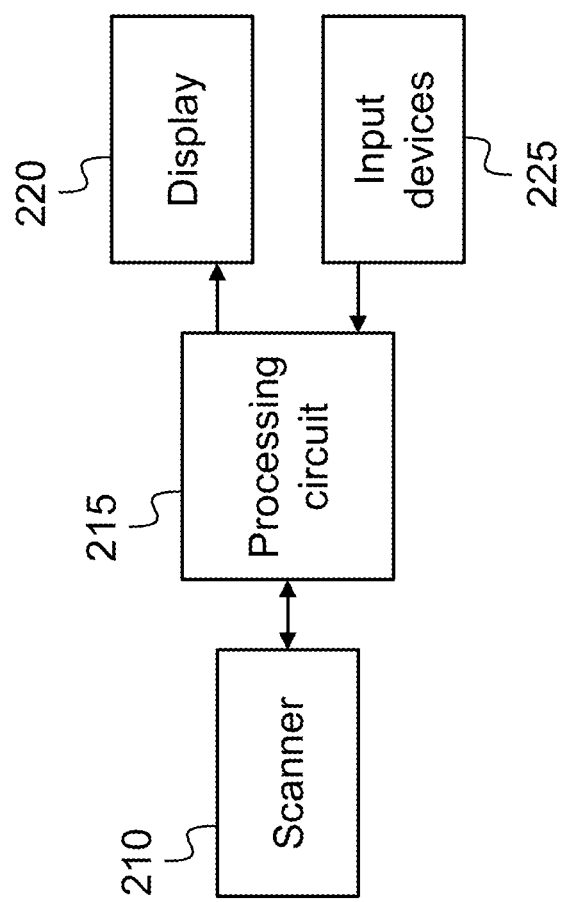
FIG. 2 is an exemplary block diagram of a system for generating 3D color representation of a 2D grayscale image, according to some embodiments of the disclosed invention.

FIG. 2 is an exemplary block diagram of a system for generating 3D color representation of a 2D grayscale image, according to some embodiments of the disclosed invention. As shown, the system includes a scanner 210, a processing circuit 215 including a processor, memory and I/O circuitry, a display device 220 for displaying images or sequences of images, and one or more input devices 225 such as a keyboard and/or mouse, that an operator may use to operate the system and to set parameters affecting the processing of the images to be displayed. In some embodiments, servers may store the images and clients may call the images, with image processing performed on the server or on the client, or both. In some embodiments, a plurality of computer instructions are stored in a memory of the processing circuit 215 and when executed by the processing circuit 215, the computer instructions perform the process for generating 3D color representation of 2D grayscale images.

Figure 3:
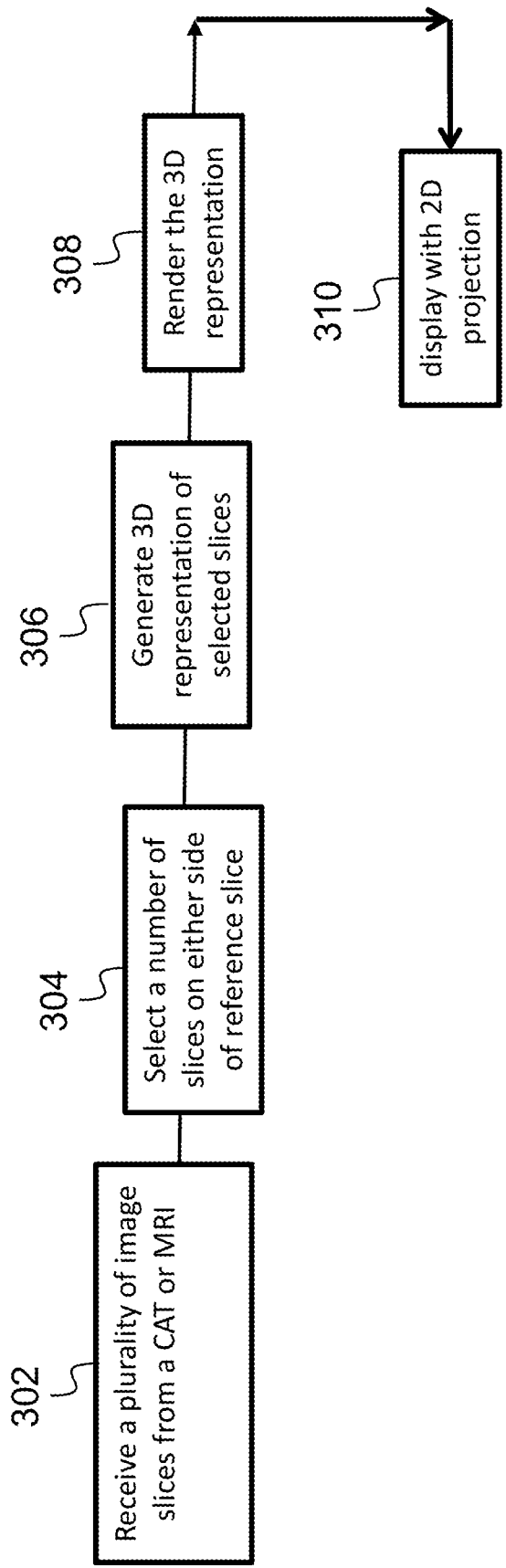
FIG. 3 is an exemplary process flow for generating 3D color representation of a 2D grayscale image, according to some embodiments of the disclosed invention.

FIG. 3 is an exemplary process flow for generating 3D color representation of a 2D grayscale image, according to some embodiments of the disclosed invention. The process is executed by one or more processors with associated known circuitry, for example, by the system of FIG. 2. As shown in block 302, a plurality of image slices are received from a scanner, for example, from the scanner 210 in FIG. 2. The scanner may produce CT or MRI images. As explained above, the image slices may be cross-sectional (tomographic) images of specific areas of a scanned object, for example, a human (or animal) body or organ.

In block 304, a number of image slices is selected on both sides (or either side) of a selected reference slice. The number of selected image slices determines the "depth" of the resulting enhanced image slice and is user programmable depending on the application and the type of the object that is being scanned. A more detailed description of the selections process is provided below, with respect to FIG. 4. In block 306, a 3D representation of the selected slices is generated using the selected number of additional image slices. In some embodiments, a 3D matrix is formed by stacking the selected number of additional image slices into a 3D array, as a 3D representation of the selected slices. A more detailed description of this process is provided below, with respect to block 406, in FIG. 4A.

In block 308, the 3D representation of the selected slices are then rendered, in a spatial dimension. In some embodiments, signal processing is performed (for example, by the processing circuit 215 of FIG. 2) on the 3D array to render it in the direction of the projection angle (3D to 2D projection). A more detailed description of this process is provided below, with respect to FIG. 5. In block 310, the rendered 3D image slices are then displayed with a 2D projection on a display device, for example display device 220 in FIG. 2. In some embodiments, a pseudo 3D processing is used to convert the spatial phases to a 3D projection. In some embodiments, the disclosed invention then repeats the above process by selected a different reference image slice and repeats the processes in blocks 306 to 310 of FIG. 3 for the newly selected reference image slice.

In some embodiments, temporal phases and spatial phases may be combined to the 3D representation of the selected slices to further improve the displayed images. Temporal phases are taken with respect to a patient being injected with a contrast agent such as iodine, where "phase 1" would be before contrast injection. An arterial phase (AR) is the first phase after injection and typically 30 seconds afterward and a portal venous (PV) phase follows the AR phase. A method for combining 3D images in color and generating a 2D projection, such as in block 308 of FIG. 3, is described in co-owned U.S. Pat. No. 10,102,682, the entire content of which is expressly incorporated by reference herein. Similar to photography, rendering of a 3D object is a projection of 3D space on to a 2D image. The use of color and texture allows one to interpret the 2D image and extract 3D information from it to make the objects look 3D even though it is being viewed in 2D.

In some embodiments, the 2D projection display includes forming raw density arrays from the scan, where each raw density array is a three-dimensional array. A processed density array is then formed by one or more operations, such as taking the difference between two raw density arrays, rotating the processed density array, multiplying the processed density array by a front-lighting array, and/or projecting the processed density array onto a plane to form an image. This projection includes calculating spatial statistics for each of a set of vectors each corresponding to a pixel of the image. The statistics include a vector mean, a vector maximum, and a vector standard deviation.

Figure 4A:
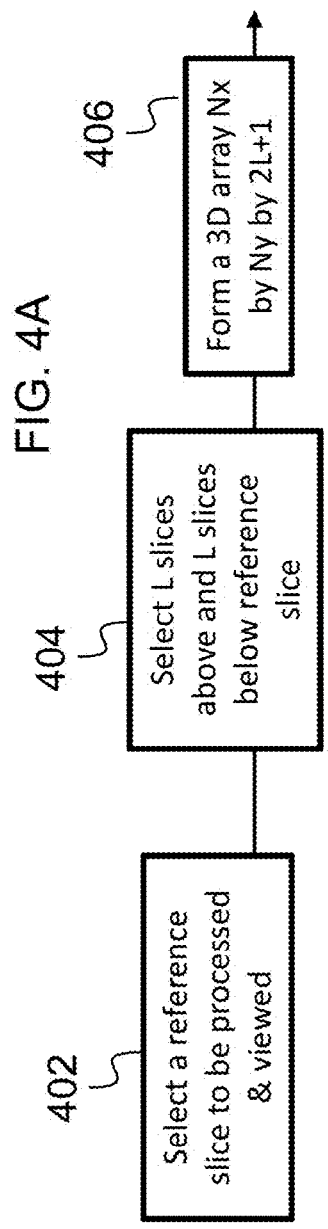
FIG. 4A is an exemplary process flow for selecting a number of image slices on either side of a current image slice, according to some embodiments of the disclosed invention.

FIG. 4A is an exemplary process flow for selecting a number of image slices on either side of a reference image slice, such as in block 304 of FIG. 3, according to some embodiments of the disclosed invention. In block 402, the process selects a reference image slice, which in this case is the center slice of a multitude of slices being used to enhance the reference slice for better viewing via 3D vs 2D features.

In some embodiments, multiple slices above and below the reference slice are used. For example, in block 404, L image slices above and L image slices below the reference image slice is selected. The number of selected image slices is typically determined by the size of the object (organ) of interest. The larger the size of the object is, the larger number of image slices are selected. For example, if a liver spans 50 slices, it might be better to use more slices in the 3D rendering, versus for instance a pancreas where there might only be 3 or 4 slices in which case the number of desired slices is smaller.

Figure 4B:
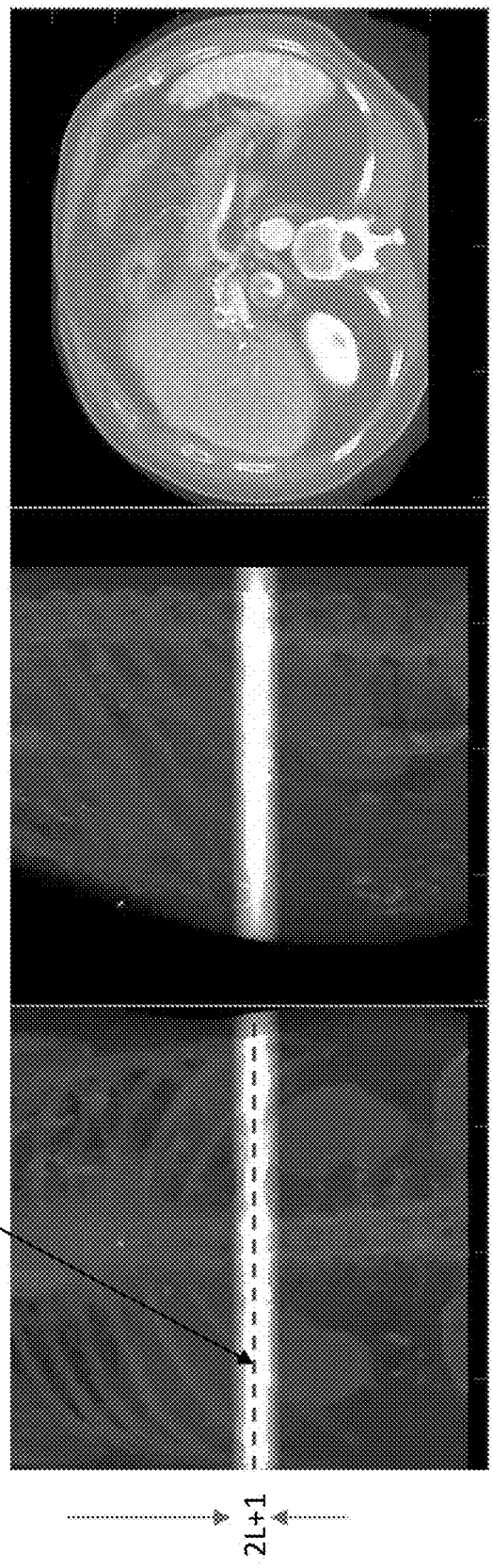
FIG. 4B shows an example of a front view of a 3D CT scan, according to some embodiments of the disclosed invention.

FIG. 4B shows a front view, a side view, and a top view of a 3D CT scan where the processed region is highlighted (Nx by Nz). As depicted in FIG. 4B, the same 3D image is projected into three different viewing angles, the front, the side, and above the object. In these embodiments, the highlighted region is pointing to the slice that is selected for viewing along with the L slices on either side. The highlighted region provides a reference to where the radiologist is looking when viewing the slice or the enhanced slide which is illustrated on the right side of FIG. 4B In block 406 of FIG. 4A, a 3D array with the size of Nx, Ny, (2L+1) is formed from the selected (2L+1) image slices. In other words, all the slices in the CT or MRI scan are collected into a 3D array, for example, a cube formed from many 2D slices, which needs to be displayed. In some embodiments, a projection of the 3D cube with an assumed viewing angle is performed to display the cube. One popular projection method is the maximum intensity projection (MIP), where a line is drawn through the cube along the viewing direction and the peak is taken as the intensity. Generally, the MIP is a method for 3D data that projects in the visualization plane the voxels with maximum intensity that fall in the way of parallel rays traced from the viewpoint to the plane of projection. This implies that two MIP renderings from opposite viewpoints are symmetrical images if they are rendered using orthographic projection.

Figure 5:
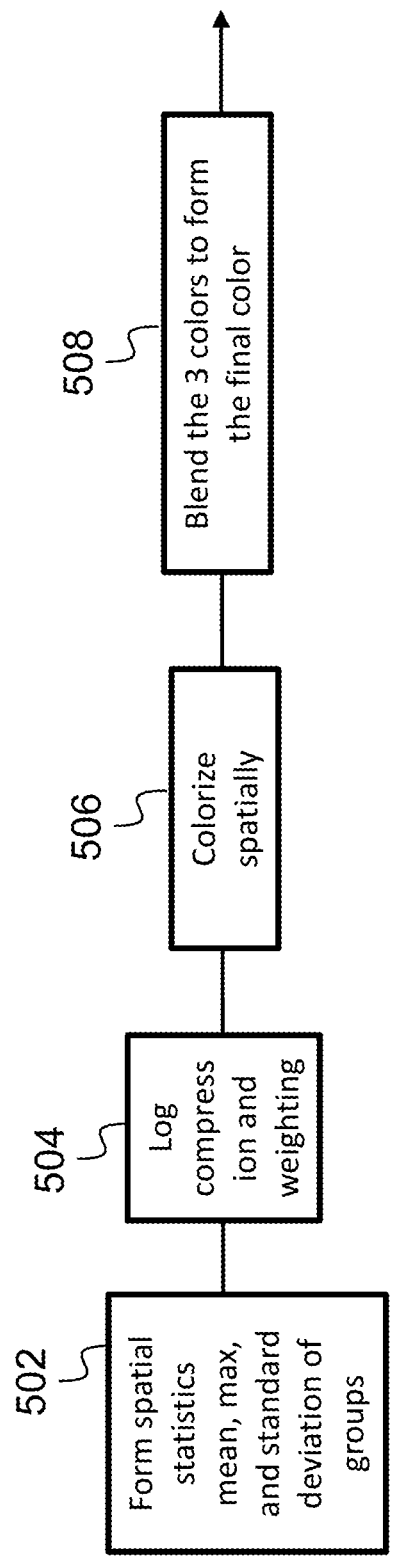
FIG. 5 is an exemplary process flow for generating a 3D representation of the selected image slices, according to some embodiments of the disclosed invention.

This 3D array of image slices (e.g., cube) is then ready for 3D to 2D projection in color, such as in block 308 of FIG. 3, according to the process flow of FIG. 5.

FIG. 5 is an exemplary process flow for generating a 3D representation of the selected image slices, such as in block 308 of FIG. 3, according to some embodiments of the disclosed invention. Similar to the MIP method explained above, other statistics can be formed along the lines of projection. By combining a mean, a max, and a standard deviation, a superior projection can be formed when compared to simple MIP. Calculating the statistics in three primary colors would mean that the statistics are calculated along different parts of the line of projection, separated spatially.

As shown in block 502, spatial statistics, for example, means, max, minimums, and standard deviation for each voxel of the set of selected image slices are calculated, for each color region. For example, slices 1-7, 8-14, and 15-21 each get a mean, max, and standard deviation. In some embodiments, the statistics may include a vector mean, a vector maximum, and a vector standard deviation. A first pixel value is also calculated for each vector as a weighted sum of the statistics of the plurality of statistics, in spatial dimension.

In block 504, each selected image slice is weighted and log compressed. In some embodiments, the weighting is determined empirically, based on the quality of the projection with respect to extracting features/statistics. Log compression allows smaller intensities to be seen in the imagery due to dynamic range compression. The weighing emphasizes the center slice.

For example, in an array of length three, $X(1)$, $X(2)$, and $X(3)$ are the values that can be translated into RGB colors. In some embodiments, $X(1)$ is calculated based on the following equations:

$$X(1) = c1*\log(avg1) + c2*\log(x \max 1) + c3*\log(x \text{ std } 1)$$

$$X(2) = c1*\log(avg2) + c2*\log(x \max 2) + c3*\log(x \text{ std } 2)$$

$$X(3) = c1*\log(avg3) + c2*\log(x \max 3) + c3*\log(x \text{ std } 3) \quad (1)$$

where c1, c2 and c3 are the weights that combine the statistics, which are determined empirically and can be different for different users or objects being scanned. Avg1, avg2, and avg3 are the averages over each respective region, xmax1, xmax2, and xmax3 are the maximum values over the respective regions, and xstd1, xstd2, and xstd3 are the standard deviations over the respective regions.

In block 506, the weighted selected image slices are colorized spatially. This way, the disclosed invention uses log compression before weighting and colorizes spatially to produce a 3D-like view to improve the image display. This is in contrast to colorizing temporally, which allows the radiologist to translate color into a temporal increase or decrease in density which can translate into the detection of an anomaly (malignant). For example, each image slice is assigned three primary colors, R, G and B.

In block 508, the three colors are blended to form a final color for each voxel. In some embodiments, the three colors are simply added together to form the final color for the voxel. For instance, if R=10, G=12, and B=8 for a voxel of a given image slice, the resulting color (10,12,8) would be a light shaded green. The image slice with the final colors is then displayed with 2D projection, as described with respect to block 310 of FIG. 3.

This way, the disclosed invention takes the current gray scale image slices (+/−N slices from the current/center image slice)×M spatial scan phases, colorizes spatially and then projects the 3D result into a 2D display.

Displaying the image comprises displaying each pixel of the image with a first color intensity proportional to the corresponding first pixel value, a second color intensity proportional to the corresponding second pixel value, and a third color intensity proportional to the corresponding third pixel value.

Figure 6:
FIG. 6 depicts an example of a 2D projection image of the 3D representation of selected image slices, according to some embodiments of the disclosed invention.

An example of the resulting 2D projection of the 3D representation of the selected slices is depicted in FIG. 6. As illustrated, this 2D projection image is an enhanced image slice, which includes multiple colors and appears as a significant enhancement to the scan by scan analysis, where irregular shaped objects, such as human or animal organs (e.g., pancreas) benefit the most from this approach.

This way, the slice by slice analysis that many users (e.g., radiologist) prefer is retained with substantial enhancement to the displayed slices. The single gray slice that radiologist currently view, can be also be viewed together side by side with the enhanced 3D projection, if desired.

Although some examples herein are explained in the context of CT or MRI scans of a human patient, the disclosed invention is not limited thereto, and in some embodiments other kinds of scans such as positron emission tomography scans, scans of objects other than human patients, radar scans, electro-optical image scans and the like may be processed in an analogous fashion. Accordingly, the present invention not only improves medical image scanning, but also improves other technologies, such as radars, and electro-optical scanning technologies.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope of the invention as defined by the appended drawings and claims.

The invention claimed is:

1. A method for generating three-dimensional (3D) color representation of two-dimensional (2D) grayscale images, the method comprising:
   receiving a plurality of 2D grayscale image slices generated by scanning an object;
   selecting a reference image slice from the plurality of 2D grayscale image slices;
   selecting a number of additional image slices on either or both sides of the selected reference image slice;
   generating a 3D representation of the selected reference image slice using the selected number of additional image slices;
   rendering a 3D color representation of the selected reference image slice by spatially colorizing the 3D representation of the selected reference image slice forming a 3D density array by:
      one or more of taking the difference between two raw density arrays, rotating the raw density array, multiplying the raw density array by a front-lighting array, and projecting the processed density array onto a plane to form an image; and
      calculating spatial statistics for each of a set of vectors each corresponding to a pixel of a corresponding image slice, wherein the spatial statistics include a vector mean, a vector maximum, and a vector standard deviation; and
   displaying the color 3D representation of the selected reference image slice on a display device.

2. The method of claim 1, wherein the number of additional image slices on either or both sides of the selected reference image is based on a size of the object.

3. The method of claim 1, further comprising forming an image matrix by stacking the selected reference image slice and the additional image slices into a 3D array.

4. The method of claim 3, further comprising performing a projection of the 3D array with a predetermined viewing angle to display the 3D array on the display device.

5. The method of claim 4, wherein the projection is performed using a maximum intensity projection (MIP) process.

6. The method of claim 1, wherein generating a 3D representation of the selected current image slice comprises:
   calculating spatial statistics for each voxel of the selected reference image slice and the additional image slices;
   weighting and log compressing the selected reference image slice and the additional image slices based on the calculated spatial statistics;
   spatially colorizing the weighted and log compressed image slices; and
   blending colors of the spatially colorized image slices to form a final color.

7. The method of claim 6, wherein the spatial statistics include one or more of mean value, maximum value, minimum value, and standard deviation for each voxel.

8. A system for generating three-dimensional (3D) color representation of two-dimensional (2D) grayscale images comprising:
   a processor and a memory, the processor for:
      receiving a plurality of 2D grayscale image slices generated by scanning an object and storing the 2D grayscale image slices in the memory,
      selecting a reference image slice from the plurality of 2D grayscale image slices,
      selecting a number of additional image slices on either or both sides of the selected reference image slice,
      generating a 3D representation of the selected reference image slice using the selected number of additional image slices, and
   rendering a 3D color representation of the selected reference image slice by spatially colorizing the 3D representation of the selected reference image slice forming a 3D density array by:
      one or more of taking the difference between two raw density arrays, rotating the raw density array, multiplying the raw density array by a front-lighting array, and projecting the processed density array onto a plane to form an image; and
      calculating spatial statistics for each of a set of vectors each corresponding to a pixel of a corresponding image slice, wherein the spatial statistics include a vector mean, a vector maximum, and a vector standard deviation; and
   a display device for displaying the color 3D representation of the selected reference image slice.

9. The system of claim 8, wherein the number of additional image slices on either or both sides of the selected reference image is based on a size of the object.

10. The system of claim 8, wherein the processor forms an image matrix by stacking the selected reference image slice and the additional image slices into a 3D array.

11. The system of claim 10, wherein the processor performs a projection of the 3D array with a predetermined viewing angle to display the 3D array on the display device.

12. The system of claim 11, wherein the projection is performed using a maximum intensity projection (MIP) process.

13. The system of claim 8, wherein the processor generates the 3D representation of the selected reference image slice by:
  calculating spatial statistics for each voxel of the selected reference image slice and the additional image slices;
  weighting and log compressing the selected reference image slice and the additional image slices, based on the calculated spatial statistics;
  spatially colorizing the weighted and log compressed image slices; and
  blending colors of the spatially colorized image slices to form a final color.

14. The system of claim 13, wherein the spatial statistics include one or more of mean value, maximum value, minimum value, and standard deviation for each voxel.

15. A non-transitory computer storage medium for storing a plurality of computer instructions, the plurality of computer instructions, when executed by a processor, performing a method for generating three-dimensional (3D) color representation of two-dimensional (2D) grayscale images, the method comprising:
  receiving a plurality of 2D grayscale image slices generated by scanning an object;
  selecting a reference image slice from the plurality of 2D grayscale image slices;
  selecting a number of additional image slices on either or both sides of the selected reference image slice;
  generating a 3D representation of the selected reference image slice using the selected number of additional image slices;
  rendering a 3D color representation of the selected reference image slice by spatially colorizing the 3D representation of the selected reference image slice forming a 3D density array by:
    one or more of taking the difference between two raw density arrays, rotating the raw density array, multiplying the raw density array by a front-lighting array, and projecting the processed density array onto a plane to form an image; and
  calculating spatial statistics for each of a set of vectors each corresponding to a pixel of a corresponding image slice, wherein the spatial statistics include a vector mean, a vector maximum, and a vector standard deviation; and
  displaying the color 3D representation of the selected reference image slice on a display device.

16. The non-transitory computer storage medium of claim 15, further including computer instructions, when executed by a processor, forming an image matrix by stacking the selected reference image slice and the additional image slices into a 3D array and performing a projection of the 3D array with a predetermined viewing angle to display the 3D array on the display device.

17. The non-transitory computer storage medium of claim 15, wherein generating a 3D representation of the selected current image slice comprises:
  calculating spatial statistics for each voxel of the selected reference image slice and the additional image slices;
  weighting and log compressing the selected reference image slice and the additional image slices based on the calculated spatial statistics;
  spatially colorizing the weighted and log compressed image slices; and
  blending colors of the spatially colorized image slices to form a final color.

* * * * *